United States Patent
Zhang et al.

(10) Patent No.: US 12,505,652 B2
(45) Date of Patent: Dec. 23, 2025

(54) FACE SYNTHESIS FOR FORGERY DETECTION

(71) Applicant: TENCENT TECHNOLOGY (SHENZHEN) COMPANY LIMITED, Shenzhen (CN)

(72) Inventors: Yong Zhang, Shenzhen (CN); Yuchen Luo, Shenzhen (CN); Junchi Yan, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 414 days.

(21) Appl. No.: 17/989,169

(22) Filed: Nov. 17, 2022

(65) Prior Publication Data
US 2023/0085605 A1    Mar. 16, 2023

Related U.S. Application Data

(63) Continuation of application No. PCT/CN2021/100912, filed on Jun. 18, 2021.

(30) Foreign Application Priority Data

Jul. 27, 2020 (CN) .......................... 202010730209.9

(51) Int. Cl.
*G06T 3/18* (2024.01)
*G06T 3/40* (2006.01)
(Continued)

(52) U.S. Cl.
CPC .............. *G06V 10/774* (2022.01); *G06T 3/18* (2024.01); *G06T 3/40* (2013.01); *G06T 5/50* (2013.01);
(Continued)

(58) Field of Classification Search
None
See application file for complete search history.

(56) References Cited

U.S. PATENT DOCUMENTS 9,799,096 B1 *  10/2017  De la Torre .......... A63F 13/655
10,825,148 B2    11/2020  Tagra et al.
(Continued)

FOREIGN PATENT DOCUMENTS

CN        109003282 A     12/2018
CN        109191410 A      1/2019
(Continued)

OTHER PUBLICATIONS

The World Intellectual Property Organization (WIPO) International Search Report for PCT/CN2021/119651 Dec. 21, 2021 6 Pages (including translation).

(Continued)

*Primary Examiner* — Joni Hsu
(74) *Attorney, Agent, or Firm* — Anova Law Group, PLLC

(57) ABSTRACT

This application relates to a face image processing method, apparatus, computer device, and storage medium. The method includes acquiring a first face image and a second face image, the first face image and the second face image being images of real faces; generating a first updated face image with non-real face image characteristics based on the first face image; adjusting color distribution of the first updated face image according to color distribution of the second face image to obtain a first adjusted face image; acquiring a target face mask of the first face image, the target face mask being generated by randomly deforming a face region of the first face image; and blending the first adjusted face image and the second face image according to the target (Continued)

face mask to obtain a target face image. Accordingly, a diversity of target face images can be generated.

18 Claims, 11 Drawing Sheets

(51) Int. Cl.
  *G06T 5/50*   (2006.01)
  *G06T 7/90*   (2017.01)
  *G06T 11/00*  (2006.01)
  *G06T 11/60*  (2006.01)
  *G06V 10/25*  (2022.01)
  *G06V 10/774*  (2022.01)
  *G06V 10/776*  (2022.01)
  *G06V 10/82*  (2022.01)
  *G06V 20/00*  (2022.01)
  *G06V 40/16*  (2022.01)
  *G09G 5/377*  (2006.01)

(52) U.S. Cl.
  CPC .............. *G06T 7/90* (2017.01); *G06T 11/001* (2013.01); *G06T 11/60* (2013.01); *G06V 10/25* (2022.01); *G06V 10/776* (2022.01); *G06V 10/82* (2022.01); *G06V 20/95* (2022.01); *G06V 40/161* (2022.01); *G06V 40/171* (2022.01); *G09G 5/377* (2013.01); *G06T 2207/20081* (2013.01); *G06T 2207/20084* (2013.01); *G06T 2207/20221* (2013.01); *G06T 2207/30201* (2013.01); *G09G 2340/10* (2013.01)

(56) References Cited

U.S. PATENT DOCUMENTS

| | | | |
|---|---|---|---|
| 2012/0154684 A1* | 6/2012 | Luo | H04N 5/14 348/700 |
| 2013/0120777 A1* | 5/2013 | Oh | H04N 1/6011 358/1.9 |
| 2014/0201126 A1* | 7/2014 | Zadeh | A61B 5/165 706/52 |
| 2017/0208073 A1* | 7/2017 | Eleish | G06F 16/901 |
| 2019/0392611 A1* | 12/2019 | Sun | H04N 23/90 |
| 2020/0042769 A1* | 2/2020 | Yan | G06F 18/217 |
| 2020/0050893 A1* | 2/2020 | Suresh | G06T 11/40 |
| 2020/0175760 A1* | 6/2020 | Cheng | G06T 7/50 |
| 2020/0410074 A1* | 12/2020 | Dang | G06V 30/413 |
| 2021/0192184 A1* | 6/2021 | Zeng | G06V 40/166 |
| 2021/0225089 A1* | 7/2021 | Yao | G06T 19/20 |
| 2022/0005268 A1* | 1/2022 | Gruber | G06T 7/60 |
| 2023/0021661 A1* | 1/2023 | Bao | G06V 40/161 |

FOREIGN PATENT DOCUMENTS

| | | |
|---|---|---|
| CN | 109829930 A | 5/2019 |
| CN | 110458781 A | 11/2019 |
| CN | 111091055 A | 5/2020 |
| CN | 111242852 A | 6/2020 |
| CN | 111325657 A | 6/2020 |
| CN | 111754396 A | 10/2020 |

OTHER PUBLICATIONS

Deepfacelab.https://github.com/iperov/DeepFaceLab. Accessed: May 10, 2020.
Irene Amerini et al, "A SIFT-based forensic method for copy-move attack detection and transformation recovery", 2011. TIFS, IEEE Transactions on Information Forensics and Security.
Hany Farid, "Image Forgery Detection", 2009, IEEE Signal processing magazine.
Anderson Rocha et al., "Vision of the unseen: Current trends and challenges in digital image and video forensics", 2011, ACM Computing Surveys (CSUR).
Yuezun Li et al., "In ictu oculi: Exposing ai created fake videos by detecting eye blinking ", 2018, In WIFS.
Falko Matern et al., "Exploiting visual artifacts to expose deepfakes and face manipulations ", 2019, In WACVW.
Darius Afchar et al., "Mesonet: a compact facial video forgery detection network ", 2018, In WIFS.
Huy H Nguyen et al., "Capsule-forensics: Using capsule networks to detect forged images and videos ", 2019, In CASSP.
Mengnan Du et al., "Towards generalizable forgery detection with locality-aware autoencoder ", 2019, arXiv preprint arXiv:1909.05999.
Huy H Nguyen et al., "Multi-task learning for detecting and segmenting manipulated facial images and videos", 2019, arXiv preprint arXiv:1906.06876.
Joel Stehouwer et al., "On the detection of digital face manipulation ", 2020, CVPR.
Davide Cozzolino et al., "Forensictransfer: Weakly-supervised domain adaptation for forgery detection", 2018, arXiv preprint arXiv:1812.02510.
Chao Yang et al., "One-shot domain adaptation for face generation", 2020, CVPR.
Yuezun Li et al., Exposing deepfake videos by detecting face warping artifacts, 2019, CVPRW.
Lingzhi Li et al., "Face x-ray for more general face forgery detection", 2020, CVPR.
Christos Sagonas et al., "300 faces in-the-wild challenge: Database and results", 2016, IVC.
Ronneberger, O et al., "U-net: Convolutional networks for biomedical image segmentation", pp. 234-241, In International Conference on Medical image computing and computer-assisted intervention , Springer, Cham.
Andreas Rossler et al., "Faceforensics++: Learning to detect manipulated facial images", 2019, In ICCV.
Yuezun Li et al., "Celeb-df: A new dataset for deepfake forensics", 2019, arXiv preprint arXiv:1909.12962.
Ido Yerushalmy et al., "Digital image forgery detection based on lens and sensor aberration", 2011, IJCV.
Zao , "https://os-android.liqucn.com/rj/1217355.shtml". Accessed May 10, 2020.

* cited by examiner

FACE SYNTHESIS FOR FORGERY DETECTION

RELATED APPLICATIONS

This application is a continuation application of PCT Application No. PCT/CN2021/100912, filed on Jun. 18, 2021, which in turn claims priority to Chinese Patent Application No. 2020107302099 filed with the China National Intellectual Property Administration on Jul. 27, 2020 and entitled "FACE IMAGE PROCESSING METHOD, APPARATUS, COMPUTER DEVICE, AND STORAGE MEDIUM." The two applications are incorporated herein by reference in their entirety.

FIELD OF THE TECHNOLOGY

This application relates to the field of computer technologies, and in particular, to a face image processing method, apparatus, computer device, and storage medium.

BACKGROUND OF THE DISCLOSURE

With the development of artificial intelligence technologies, the face swap technology, that is, swapping a human face in a human face image with another human face to obtain a fake face image, has emerged. Increasingly, more application scenarios require the use of fake face images, for example, recognition of fake face images in human face recognition scenarios, generation of funny videos by using fake face images, and the like. However, for current fake face images, a human face in a human face image is directly swapped with another human face, and the generated fake face images are not diverse.

SUMMARY

According to various embodiments provided in this application, a face image processing method, apparatus, computer device, and storage medium are provided.

One aspect of the present disclosure provides a face image processing method. The method includes acquiring a first face image and a second face image, the first face image and the second face image being images of real faces; generating a first updated face image with non-real face image characteristics based on the first face image; adjusting color distribution of the first updated face image according to color distribution of the second face image to obtain a first adjusted face image; acquiring a target face mask of the first face image, the target face mask being generated by randomly deforming a face region of the first face image; and blending the first adjusted face image and the second face image according to the target face mask to obtain a target face image.

Another aspect of the present disclosure provides a computer device, including a memory and a processor, the memory storing computer-readable instructions, the computer-readable instructions, when executed by the processor, causing the processor to perform the following operations. The operations include acquiring a first face image and a second face image, the first face image and the second face image being images of real faces; generating a first updated face image with non-real face image characteristics based on the first face image; adjusting color distribution of the first updated face image according to color distribution of the second face image to obtain a first adjusted face image; acquiring a target face mask of the first face image, the target face mask being generated by randomly deforming a face region of the first face image; and blending the first adjusted face image and the second face image according to the target face mask to obtain a target face image.

Another aspect of the present disclosure provides one or more non-transitory storage media storing computer-readable instructions are provided, the computer-readable instructions, when executed by one or more processors, causing the one or more processors to perform the following operations. The operations include acquiring a first face image and a second face image, the first face image and the second face image being images of real faces; generating a first updated face image with non-real face image characteristics based on the first face image; adjusting color distribution of the first updated face image according to color distribution of the second face image to obtain a first adjusted face image; acquiring a target face mask of the first face image, the target face mask being generated by randomly deforming a face region of the first face image; and blending the first adjusted face image and the second face image according to the target face mask to obtain a target face image.

Details of one or more embodiments of this application are provided in the following accompanying drawings and descriptions. Other features, objectives, and advantages of this application become apparent from this specification, the drawings, and the claims.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show some embodiments of the present invention, and a person of ordinary skill in the art may still derive other accompanying drawings from these accompanying drawings without creative efforts.

DESCRIPTION OF EMBODIMENTS

To make the objectives, technical solutions, and advantages of this application clearer and more understandable, this application is further described in detail below with reference to the accompanying drawings and the embodiments. It is to be understood that the example embodiments described herein are only used for explaining this application, and are not used for limiting this application.

The solutions provided by the embodiments of this application involve technologies such as image detection and deep learning of artificial intelligence, and are described by the following embodiments.

Figure 1:
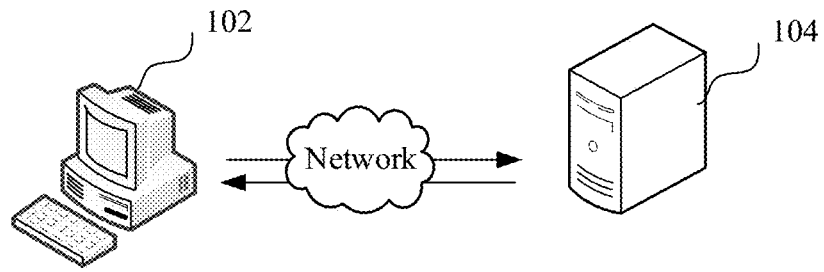
FIG. 1 is an application environment diagram of a face image processing method consistent with an embodiment of this disclosure.

A face image processing method provided in this application may be applied to an application environment shown in FIG. 1. A terminal 102 communicates with a server 104 through a network. The server 104 acquires a first face image and a second face image from the terminal 102, the first face image and the second face image being images of real faces. The server 104 processes the first face image to generate a first updated face image with non-real face image characteristics; adjusts color distribution of the first updated face image according to color distribution of the second face image to obtain a first adjusted face image; and acquires a target face mask of the first face image, the target face mask being generated by randomly deforming a face region of the first face image. The server 104 blends the first adjusted face image and the second face image according to the target face mask to obtain a target face image. The terminal 102 may be, but not limited to, a personal computer, a notebook computer, a smartphone, a tablet computer, and a portable wearable device. The server 104 may be implemented by an independent server or a server cluster including a plurality of servers.

Figure 2:
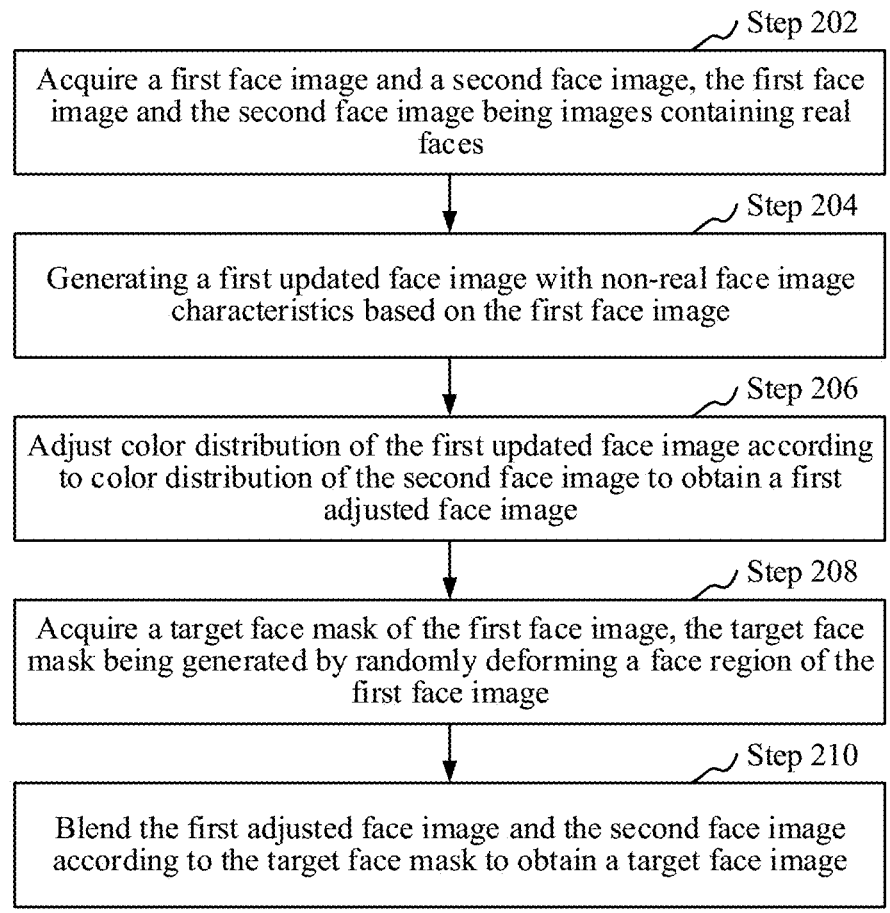
FIG. 2 is a schematic flowchart of a face image processing method consistent with an embodiment of this disclosure.

In one embodiment, as shown in FIG. 2, a face image processing method is provided, and illustration is made by taking the method applied to the server in FIG. 1 as an example. It is understandable that the method may also be applied to a terminal, or be applied to a system including a terminal and a server and implemented through interaction between the terminal and the server. In this embodiment, the method includes the following steps:

Step 202: Acquire a first face image and a second face image, the first face image and the second face image being images of real faces.

The face image refers to a real, unforged face image, including a human face image, an animal face image, and the like. The first face image refers to a source face image that requires face image blending, and the second face image refers to a face image to be blended that requires face image blending.

In some embodiments, the server acquires the first face image and the second face image. The server may acquire the face images in various manners. For example, the server acquires face images uploaded by the terminal. The server may acquire face images from a preset face image database. The server may also acquire face images from a third-party platform. The server may collect face images from the Internet. The server may acquire face images from a video. Then, the first face image and the second face image that are to be blended are determined from the acquired face images. The acquired first face image and second face image may be face images of the same type. For example, the first face image and the second face image may be face images of the same type of animals, and the first face image and the second face image may also both be human face images of males. The acquired first face image and second face image may also be face images of different types. For example, the first face image is a face image of a cat, and the second face image is a face image of a dog. For another example, the first face image is a human face image of a male, and the second face image is a human face image of a female.

In one embodiment, the server acquires the first face image and the second face image, and when sizes of the first face image and the second face image are inconsistent, the sizes of the first face image and the second face image are adjusted to be consistent. For example, the size of the first face image may be adjusted to be the same as the size of the second face image. The size of the second face image may also be adjusted to be the same as the size of the first face image. A preset size may also be acquired, and the size of the first face image and the size of the second face image are respectively adjusted to be consistent with the preset size. For example, the size of the first face image is 2.5*3.5 cm, the size of the second face image is 3.5*4.9 cm, and the size of the first face image and the size of the second face image are adjusted to be consistent with a preset size 3.5*4.9 cm.

Step 204: Process the first face image to generate a first updated face image with non-real face image characteristics.

A non-real face image refers to a face image that is not real and is forged by a technical means, such as a face swapped image obtained through the artificial intelligence face-swapping technology. The non-real face image characteristics refer to image characteristics of the non-real face image, and the image characteristics include smooth image transition, inconsistent image definition, image noise, and the like. The first updated face image refers to a face image obtained after image processing, and the first updated face image has the non-real face image characteristics. For example, the first updated face image has an effect of a face image generated using a generative adversarial network.

In some embodiments, the server may process the first face image by using an image processing algorithm. The image processing algorithm includes an image blur algorithm, an image compression algorithm, a random noise adding algorithm, and the like. The image blur algorithm includes a Gaussian blur algorithm, a mean value blur algorithm, a dual blur algorithm, a bokeh blur algorithm, a tilt shift blur algorithm, and so on. The image compression algorithm includes a Joint Photographic Experts Group (JPEG) compression algorithm, a Huffman encoding compression algorithm, a run-length encoding compression algorithm, and the like. The random noise adding algorithm includes a Gaussian noise adding algorithm, a Poisson noise adding algorithm, a salt-and-pepper noise adding algorithm, and the like. The server may randomly select an image processing algorithm to process the first face image, and obtain the first updated face image with the non-real face image characteristics. For example, the obtained first updated face image may have the characteristic of smooth transition, or the characteristic of inconsistent image definition, or the characteristic of image noise. A plurality of image processing algorithms may also be selected to process the first face image, and an image obtained by a final processing is used as the first updated face image with the non-real face image characteristics. For example, the obtained first updated face image may have the characteristics of smooth transition and inconsistent image definition, or the obtained first updated face image may have the characteristics of smooth transition and image noise, or may have the characteristics of inconsistent image definition and image noise. Alternatively, the obtained first updated face image has the characteristics of smooth image transition, inconsistent image definition, and image noise.

In one embodiment, the server may first process the first face image by using an image blur algorithm to obtain a processed image, and then compress the processed image by using an image compression algorithm to obtain a compressed image. The compressed image is used as the first updated face image, or random noise may be added to the compressed image by using a random noise adding algorithm to obtain the first updated face image. By processing the image to simulate the effect of an image generated by the generative adversarial network, the diversity of the generated target face image is improved.

Step 206: Adjust color distribution of the first updated face image according to color distribution of the second face image to obtain a first adjusted face image.

The color distribution refers to distribution of an image in an RGB (a color standard) color space. The first adjusted face image refers to a face image obtained by adjusting the color distribution of the first updated face image, and the adjusted color distribution is similar to the color distribution of the second face image.

In some embodiments, the server adjusts the color distribution of the first updated face image by using a color adjustment algorithm according to the color distribution of the second face image to obtain the first adjusted face image. The color adjustment algorithm may include a linear color migration algorithm, a LAB space color migration algorithm, a probability density-based color migration algorithm, a color sub-histogram matching algorithm, and the like. Each time the server generates a target face image, the server may randomly select a color adjustment algorithm, and then adjust the color distribution of the first updated face image by using the randomly selected color adjustment algorithm according to the color distribution of the second face image, so as to obtain the first adjusted face image.

Step 208: Acquire a target face mask of the first face image, the target face mask being generated by randomly deforming a face region of the first face image.

The face mask refers to an image obtained by initializing all pixel values in the face region in the first face image to 255, that is, initializing the face region to white, and at the same time, initializing pixel values of a region in the first face image other than the face region to 0, that is, initializing the region other than the face region to black. The target face mask is an image generated by randomly deforming the face region of the first face image.

In some embodiments, the server acquires the target face mask of the first face image. Face keypoints of the first face image may be extracted in advance, the face region is obtained according to the face keypoints, and then the face region is randomly deformed to obtain a face image with a deformed face region. Then, a corresponding target face mask is generated according to the face image with the deformed face region. During the random deformation of the face region, an area of the face region may be acquired, and then the magnitude of the area of the face region may be adjusted randomly. For example, the area of the face region is 20, and the area of the face region is adjusted to be 21. A boundary line of the face region may also be acquired, and a position or type of the boundary line of the face region may be adjusted randomly. For example, a linear boundary line is adjusted to a curve. For example, the position of the boundary line is adjusted by randomly displacing a position of a center point of the boundary line. For example, the coordinates of the center point of the boundary line are (1,1), and may be randomly adjusted to (1,2). Boundary keypoints of the face region may also be acquired, and positions of the boundary keypoints of the face region may be adjusted randomly. For example, positions of all boundaries keypoints are randomly displaced.

In one embodiment, the server may also generate a face mask of the first face image in advance, and then randomly deform a face region in the face mask of the first face image to obtain the target face mask. In one embodiment, the server may also directly acquire the target face mask of the first face image from a database.

Step 210: Blend the first adjusted face image and the second face image according to the target face mask to obtain a target face image.

The target face image refers to a face image obtained according to blending of the first adjusted face image and the second face image, and the target face image is a non-real face image, that is, a fake face image.

In some embodiments, the server blends the first adjusted face image and the second face image by using an image blending algorithm according to the target face mask to obtain the target face image. The image blending algorithm includes an Alpha Blending algorithm, a Poisson blending algorithm, a Laplacian pyramid blending algorithm, a wavelet transform-based image blending algorithm, a neural network-based image blending algorithm, and the like. Each time the server blends the first adjusted face image and the second face image according to the target face mask, the server randomly selects an image blending algorithm first, and then performs blending according to the randomly selected image blending algorithm to obtain the target face image.

In the above image processing method, by processing the first face image, the first updated face image with the non-real face image characteristics is generated, and then the color distribution of the first updated face image is adjusted according to the color distribution of the second face image to obtain the first adjusted face image. The target face mask of the first face image is acquired, and the target face mask is generated by randomly deforming the face region of the first face image. The first adjusted face image and the second face image are blended according to the target face mask to obtain the target face image. The target face image constructed by the above method can accurately imitate effects of a fake face image, such as including non-real face image characteristics, having the color distribution of a non-real face image, and having a face region shape of a non-real face image. Moreover, when a large number of target face images are generated by the above method, the acquired target face mask is generated by randomly deforming the face region of the first face image, so that the large number of generated target face images have rich diversity.

Figure 3:
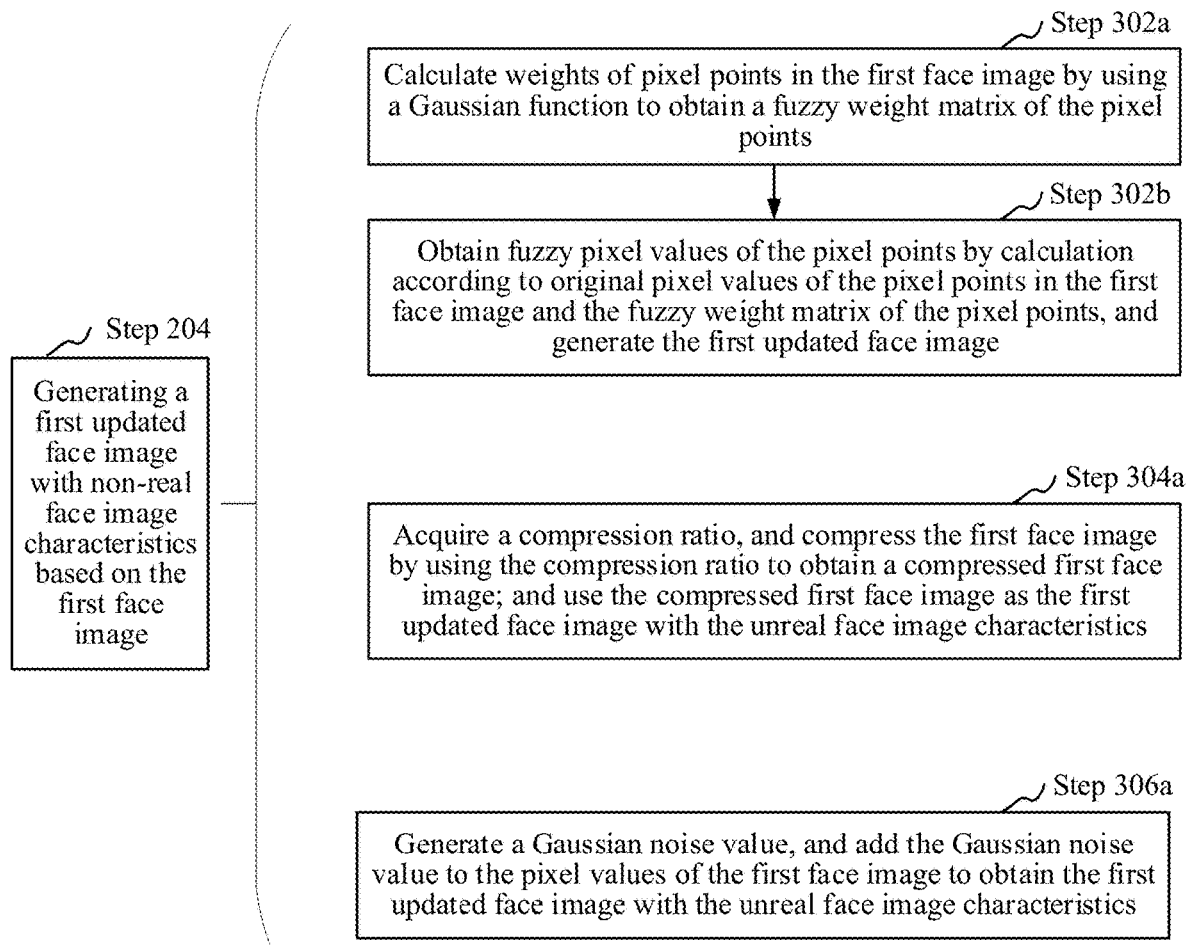
FIG. 3 is a schematic diagram of generating a first updated face image consistent with an embodiment of this disclosure.

In one embodiment, as shown in FIG. 3, step 204 of generating a first updated face image with non-real face image characteristics based on the first face image includes the following steps:

Step 302a: Calculate weights of pixel points in the first face image by using a Gaussian function to obtain a fuzzy weight matrix of the pixel points.

The Gaussian function refers to a density function of normal distribution, and the Gaussian function in a two-dimensional form is shown by the following formula (1):

$$G(x, y) = \frac{1}{2\pi\sigma^2} e^{-(x^2+y^2)/2\sigma^2} \quad \text{Formula (1)}$$

In the formula, G refers to a fuzzy weight matrix of the pixel points, e refers to a natural constant, π is the Pi, σ refers to a Gaussian radius, which is preset, and x and y refer to coordinates of a pixel point in the first face image.

In some embodiments, the server acquires a preset Gaussian radius and coordinates of the pixel points in the first face image, and then calculates weights of the pixel points in the first face image by using the Gaussian function to obtain the fuzzy weight matrix of the pixel points.

Step 302b: Obtain fuzzy pixel values of the pixel points according to original pixel values of the pixel points in the first face image and the fuzzy weight matrix of the pixel points, and generate the first updated face image with the non-real face image characteristics based on the fuzzy pixel values of the pixel points.

In some embodiments, the server performs a convolution operation by using the original pixel values of the pixel points in the first face image and the fuzzy weight matrix of the pixel points to obtain the fuzzy pixel values of the pixel points, and obtains the first updated face image with the non-real face image characteristics according to the fuzzy pixel value of each pixel point.

In one embodiment, the server may perform a fuzzy processing on the first face image by using Gaussian convolution. A scale of the Gaussian convolution includes 3×3, 5×5, 7×7, 9×9, 11×11, and so on. Each time the server performs a fuzzy processing on the first face image by using the Gaussian convolution, a scale of Gaussian convolution is randomly selected to perform the fuzzy processing to obtain the first face image after the fuzzy processing, and the target face image is generated by using the first face image after the fuzzy processing, thereby improving the diversity of the generated target face image.

In the above embodiment, the weights of the pixel points in the first face image are calculated by using the Gaussian function to obtain the fuzzy weight matrix of the pixel points, and the fuzzy pixel values of the pixel points are obtained according to the original pixel values of the pixel points in the first face image and the fuzzy weight matrix of the pixel points to generate the first updated face image. The first updated face image can be quickly obtained, which is convenient for subsequent processing and ensures that the effect of the generated target face image reaches the effect of a fake face image.

In one embodiment, as shown in FIG. 3, step 204 of generating a first updated face image with non-real face image characteristics based on the first face image includes the following steps:

Step 304a: Acquire a compression ratio, and compress the first face image by using the compression ratio to obtain a compressed first face image; and use the compressed first face image as the first updated face image with the non-real face image characteristics.

The compression ratio refers to a ratio of the internal memory size occupied by the face image after compression to the internal memory size occupied by the face image before compression, and there is a plurality of preset compression ratios.

In some embodiments, each time the server performs face image compression, the server randomly acquires a compression ratio used in the current compression from the preset compression ratios, and then compresses the first face image by using the compression ratio to obtain a compressed first face image. The compressed first face image is used as the first updated face image with the non-real face image characteristics, so that the first face image with different definitions can be obtained, which is convenient for subsequent use, ensures that the effect of the generated target face image reaches the effect of the fake face image, and improves the diversity of the generated target face image. In one embodiment, the compression ratio may also be transmitted by a terminal and acquired by the server, that is, a user may input the compression ratio through the terminal, so that the server acquires the compression ratio. The server uses the compression ratio transmitted by the terminal as the compression ratio used in the current compression, and compresses the first face image to obtain the compressed first face image.

In one embodiment, as shown in FIG. 3, step 204 of generating a first updated face image with non-real face image characteristics based on the first face image includes the following steps:

Step 306a: Generate a Gaussian noise value, and add the Gaussian noise value to the pixel values of the first face image to obtain the first updated face image with the non-real face image characteristics.

The Gaussian noise refers to noise whose probability density function obeys Gaussian distribution. The Gaussian noise value is a random number sequence randomly generated based on means and variances of the Gaussian noises.

In some embodiments, the server pre-stores means and variances of different Gaussian noises. When adding the noise, the server randomly selects a mean and variance of a Gaussian noise that needs to be used currently, and generates a Gaussian noise value according to the mean and variance of the Gaussian noise. Then, the Gaussian noise value is added to the pixel values of the first face image, and obtained pixel values are compressed into a pixel value interval content to obtain the first face image with the non-real face image characteristics. By adding the Gaussian noise value, the first updated face image with the non-real face image characteristics is generated, which is convenient for subsequent use, ensures that the effect of the generated target face image reaches the effect of the fake face image, and improves the diversity of the generated target face image as the mean and variance of the Gaussian noise that needs to be used currently is selected randomly. In one embodiment, the server may directly acquire a preset Gaussian noise value from a database. The server may also acquire a Gaussian noise value uploaded by the terminal, or acquire a Gaussian noise value transmitted by a business server, or the like.

Figure 4:
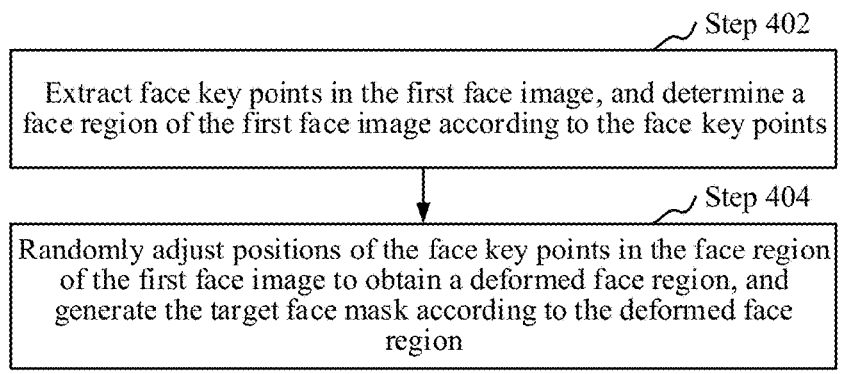
FIG. 4 is a schematic flowchart of generating a target face mask consistent with an embodiment of this disclosure.

In one embodiment, as shown in FIG. 4, step 208 of acquiring a target face mask of the first face image, the target face mask being generated by randomly deforming a face region of the first face image includes the following steps:

Step 402: Extract face keypoints in the first face image, and determine a face region of the first face image according to the face keypoints.

The face keypoints are used for representing features of a face.

In some embodiments, the server extracts the face keypoints in the first face image by using a face keypoint extraction algorithm. The face keypoint extraction algorithm includes a feature Point Distribution Model (PDM)-based extraction algorithm, a Cascaded Pose Regression (CPR)-based algorithm, a deep learning-based algorithm, and the like. The face keypoint extraction algorithm may be an Active Shape Model (ASM) algorithm, an Active Appearance Model (AAM) algorithm, a Cascaded pose regression (CPR) algorithm, a Supervised Descent Method (SDM) algorithm, and a Deep Convolutional Neural Network (DCNN) algorithm, and then the extracted face keypoints are connected into a polygon. The polygon contains all the extracted face keypoints, and the interior of the polygon is the face region of the first face image.

In some embodiments, the server extracts 68 face keypoints by using a landmark (a human face feature point extraction technology) algorithm. By connecting the face keypoints into a polygon, the polygon contains 68 face keypoints, and the face region of the first face image is obtained.

In one embodiment, the server may generate a face mask based on the determined face region of the first face image. That is, the face mask is generated by using the undeformed first face image, and the generated face mask is used as the target face mask for subsequent processing, so that the generated target face image has diversity.

Step 404: Randomly adjust positions of the face keypoints in the face region of the first face image to obtain a deformed face region, and generate the target face mask according to the deformed face region.

In some embodiments, the server randomly changes positions of the face keypoints in the face region of the first face image, connects the face keypoints whose positions are changed into a polygon to obtain the deformed face region, and then generates a target face mask according to the deformed face region and other regions of the first face image. The position of each face keypoint is changed randomly, random change values of the positions of the face keypoints and original values of the positions of the face keypoints may be acquired, and sums of the random change values of the positions of the face keypoints and the original values of the positions of the face keypoints may be calculated to obtain position values of the face keypoints after the change. In one embodiment, the server may randomly adjust the positions of the face keypoints on a boundary of the polygon, and connect the face keypoints whose positions are changed into a polygon to obtain a deformed face region.

In one embodiment, after extracting the face keypoints in the first face image, the positions of the face keypoints in the first face image may be directly adjusted randomly to obtain the deformed face region, and the target face mask is generated according to the deformed face region.

In the above embodiment, by randomly adjusting the positions of the face keypoints in the face region of the first face image, the deformed face region is obtained, the target face mask is generated according to the deformed face region, and the target face mask is used for subsequent processing, which improves the diversity of the generated target face image.

In one embodiment, after step 208, that is, after the acquiring a target face mask of the first face image, the target face mask being generated by randomly deforming a face region of the first face image, the method further includes steps of:

performing face occlusion detection on the second face image to obtain a face occlusion region; and adjusting the target face mask according to the face occlusion region to obtain an adjusted face mask.

The occlusion detection refers to detecting whether a face region in the second face image is occluded. The face occlusion region refers to a region in the second face image where a face is occluded. The adjusted face mask refers to a face mask obtained after removing the face occlusion region from the face region in the target face mask.

In some embodiments, the server performs face occlusion detection on the second face image by using a deep learning segmentation network algorithm, obtains various segmented regions, and determines the face occlusion region from the segmented regions. Then, a binarization value corresponding to each pixel point in the target face mask is adjusted according to a binarization value corresponding to each pixel point in the face occlusion region, and an adjusted binarization value of each pixel point is obtained. The adjusted face mask is obtained according to the adjusted binarization value of each pixel point. The deep learning segmentation network algorithm may be a Unet (a fully convolutional network (FCN) for semantic segmentation) network algorithm, a SegNet (a convolutional neural network of an encoder-decoder structure) network algorithm, a Deeplab (dilated convolutional network) network algorithm, and so on.

Figure 5:
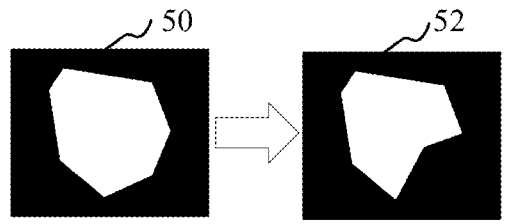
FIG. 5 is a schematic diagram of obtaining an adjusted face mask according to some embodiments.

In some embodiments, as shown in FIG. 5, a schematic diagram of obtaining the adjusted face mask is shown. An adjusted face mask 52 is obtained by adjusting a target face mask 50 according to the face occlusion region.

Step 210 of blending the first adjusted face image and the second face image according to the target face mask to obtain a target face image includes a step of:

blending the first adjusted face image and the second face image according to the adjusted face mask to obtain the target face image.

In some embodiments, the server blends the first adjusted face image and the second face image by using an image blending algorithm according to the adjusted face mask to obtain the target face image.

In the above embodiment, the adjusted face mask is obtained by performing occlusion detection on the second face image, and the first adjusted face image and the second face image are blended by using the adjusted face mask to obtain the target face image, thereby improving the diversity of the generated target face image.

In one embodiment, the adjusting the target face mask according to the face occlusion region to obtain the adjusted face mask includes steps of:

calculating differences between mask values of pixel point in the target face mask and occlusion values of pixel point in the face occlusion region, and using the differences as mask adjustment values; and obtaining the adjusted face mask according to the mask adjustment values.

The mask values of the pixel points refer to binarization values of the pixel points in the target face mask, and the occlusion values refer to binarization values of the pixel points in the face occlusion region. The mask adjustment value refers to a binarization value of each pixel point of the adjusted face mask.

In some embodiments, the server calculates the differences between the mask values of the pixel points in the target face mask and the occlusion values of the pixel points in the face occlusion region in the second face image to obtain the mask adjustment values. In some embodiments, the values of the pixel points in the face region in the target face mask are 1, and the values of the pixel points in another region are 0. In the second face image, the values of the pixel points in the face occlusion region are 1, and the values of the pixel points in an unoccluded region are 0. The value of each pixel point in the second face image is subtracted from the value of each pixel point in the target face mask to obtain the value of each pixel point after adjustment, and the adjusted face mask is obtained according to the values of the pixel points after adjustment.

In the above embodiment, the differences between the mask values of the pixel points in the target face mask and the occlusion values of the pixel points in the face occlusion region are directly calculated, the differences are used as the mask adjustment values, and the adjusted face mask is obtained according to the mask adjustment values. It is ensured that when the target face image is generated by using the obtained adjusted face mask, the generated target face image achieves the effect of a fake face.

Figure 6:
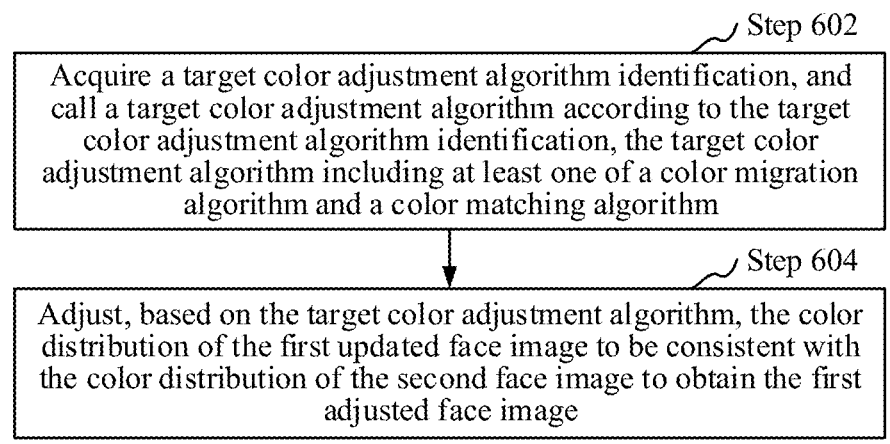
FIG. 6 is a schematic flowchart of obtaining a first adjusted face image consistent with an embodiment of this disclosure.

In one embodiment, as shown in FIG. 6, step 206 of adjusting color distribution of the first updated face image according to color distribution of the second face image to obtain a first adjusted face image includes the following steps:

Step 602: Acquire a target color adjustment algorithm identification, and call a target color adjustment algorithm according to the target color adjustment algorithm identification, the target color adjustment algorithm including at least one of a color migration algorithm and a color matching algorithm.

The target color adjustment algorithm identification is used for uniquely identifying the color adjustment algorithm. Both the target color migration algorithm and the color matching algorithm are used for adjusting the color distribution. The color migration algorithm includes a linear color migration algorithm, a LAB space color migration algorithm, a probability density-based color migration algorithm, and the like. The color matching algorithm includes a color histogram matching algorithm and the like.

In some embodiments, each time the server adjusts the color distribution of the first updated face image according to the color distribution of the second face image, the server randomly selects the target color adjustment algorithm, that is, obtains the target color adjustment algorithm identification corresponding to the selected target color adjustment algorithm. The target color adjustment algorithm is then called by using the target color adjustment algorithm identification. A call interface of each target color adjustment algorithm may be generated in advance, a corresponding call interface may be acquired according to the target color adjustment algorithm identification, and the target color adjustment algorithm may be called by using the call interface.

Step 604: Adjust, based on the target color adjustment algorithm, the color distribution of the first updated face image to be consistent with the color distribution of the second face image to obtain the first adjusted face image.

In some embodiments, the server executes the target color adjustment algorithm, and adjusts the color distribution of the first updated face image to be consistent with the color distribution of the second face image to obtain the first adjusted face image. In one embodiment, the first adjusted face image may be obtained when the color distribution of the first updated face image is adjusted to be within a preset threshold of the color distribution of the second face image.

Through the above embodiment, the color distribution of the first updated face image is adjusted to be consistent with the color distribution of the second face image to obtain the first adjusted face image, so that the first adjusted face image has color information of the second face image, and therefore, the generated target face image does not contain obvious face-swapping boundaries, ensuring that the generated target face image can accurately simulate the effect of a fake face. Moreover, each time the color distribution adjustment is performed, the target color adjustment algorithm is randomly selected to perform the color distribution adjustment, thereby increasing the diversity of the generated target face image.

Figure 7:
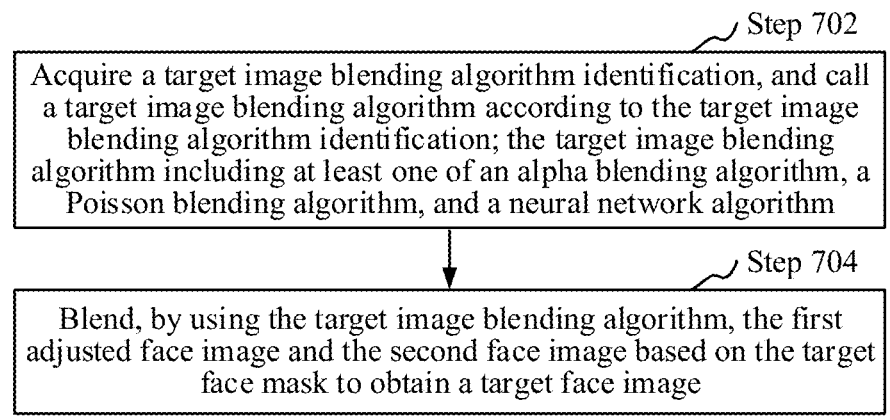
FIG. 7 is a schematic flowchart of obtaining a target face image consistent with an embodiment of this disclosure.

In one embodiment, as shown in FIG. 7, step 210 of blending the first adjusted face image and the second face image according to the target face mask to obtain a target face image includes the following steps:

Step 702: Acquire a target image blending algorithm identification, and call a target image blending algorithm according to the target image blending algorithm identification. The target image blending algorithm includes at least one of an alpha blending algorithm, a Poisson blending algorithm, and a neural network algorithm.

The target image blending algorithm identification is used for uniquely identifying the target image blending algorithm, and is used for calling a corresponding target image blending algorithm.

In some embodiments, the server randomly selects a target image blending algorithm identification from various stored image blending algorithm identifications, and executes a corresponding image blending algorithm according to the target image blending algorithm identification. In one embodiment, the server acquires a call interface of the corresponding target image blending algorithm according to the target image blending algorithm identification, and calls the target image blending algorithm by using the call interface. The target image blending algorithm includes at least one of an alpha blending algorithm, a Poisson blending algorithm, and a neural network algorithm. The neural network algorithm uses a neural network for training to obtain an image blending model in advance, and uses the image blending model to perform blending.

Step 704: Blend, by using the target image blending algorithm, the first adjusted face image and the second face image based on the target face mask to obtain a target face image.

In some embodiments, each time the server blends the first adjusted face image and the second face image, the server uses a randomly selected target image blending algorithm to perform blending based on the target face mask to obtain a blended face image, that is, the target face image. In one embodiment, the server inputs the target face mask, the first adjusted face image, and the second face image into an image blending model trained by using a neural network to obtain an outputted blended face image, that is, obtain the target face image.

In the above embodiment, by using the randomly selected target image blending algorithm to blend the first adjusted face image and the second face image based on the target face mask to obtain the target face image, the generated target face image can have diversity.

Figure 8:
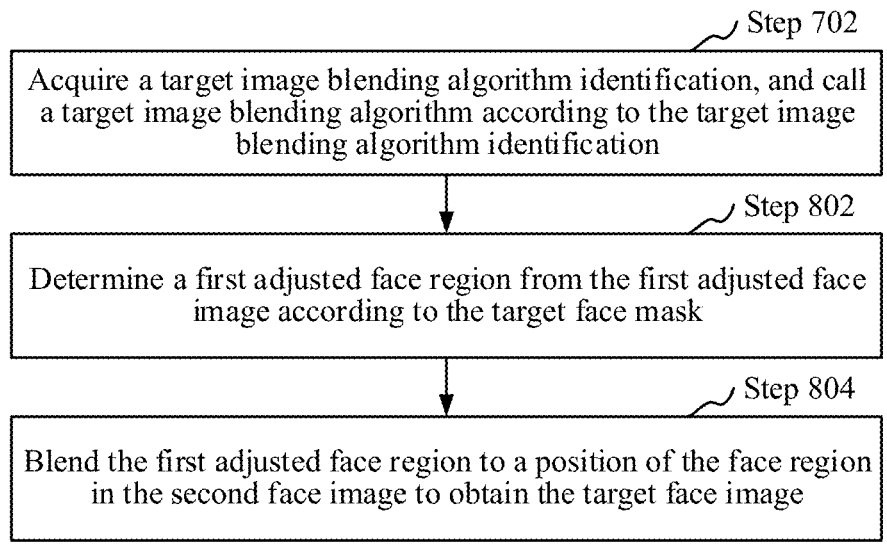
FIG. 8 is a schematic flowchart of obtaining a target face image according to another embodiment.

In one embodiment, as shown in FIG. 8, step 704 of blending, by using the target image blending algorithm, the first adjusted face image and the second face image based on the target face mask to obtain a target face image includes the following steps:

Step 802: Determine a first adjusted face region from the first adjusted face image according to the target face mask.

The first adjusted face region refers to a face region in the first adjusted face image.

In some embodiments, the server calculates products of mask values of various pixel points in the target face mask and pixel values of various pixel points in the first adjusted face image, and obtains the first adjusted face region according to product results.

Step 804: Blend the first adjusted face region to a position of the face region in the second face image to obtain the target face image.

In some embodiments, the server calculates products of inverse values of the mask values of various pixel points in the target face mask and the pixel values of various pixel points in the second face image, determines the position of the face region in the second face image according to the product results, and then blends the first adjusted face region to the position of the face region in the second face image to obtain the target face image.

In some embodiments, the target face image is obtained by using the following formula (2):

$$\text{out}=(1-\alpha)A+\alpha B \quad \text{Formula (2)}$$

In the formula, out refers to an outputted pixel value, and $\alpha$ refers to a pixel value in the target face mask, with a value range of $[0,1]$. A is a pixel value in the second face image, and B is a pixel value in the first adjusted face image. When $\alpha=0$, a pixel value of a background region is outputted, when $\alpha=1$, a pixel value of the face region is outputted, and when $0<\alpha<1$, the outputted pixel value is a pixel value after blending.

In the above embodiment, the target face image is obtained by blending the first adjusted face region to the position of the face region in the second face image, which can conveniently and quickly obtain the target face image.

Figure 9:
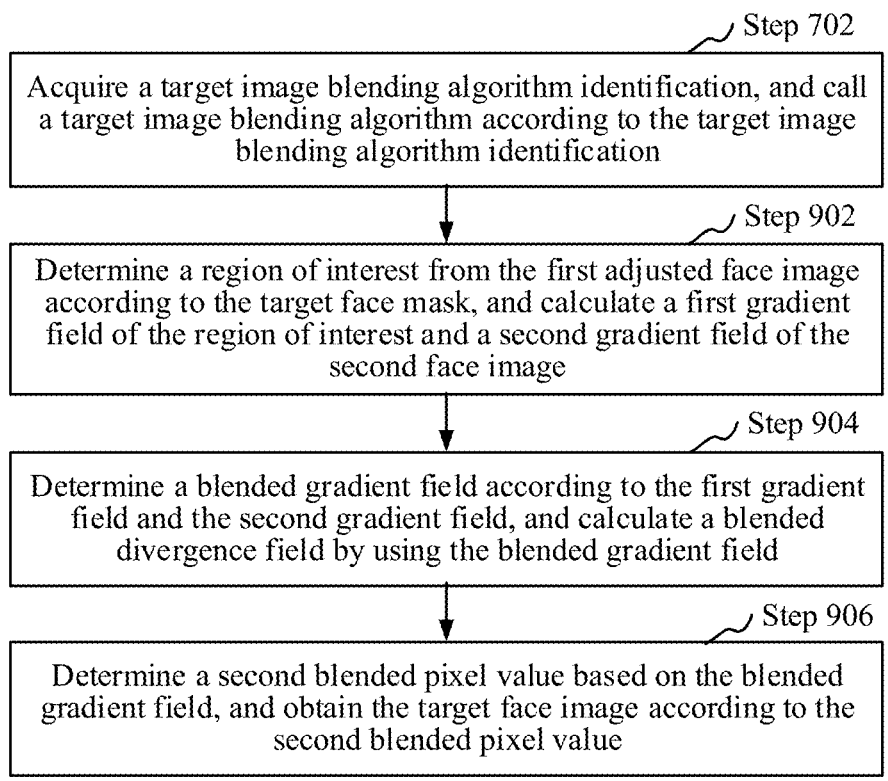
FIG. 9 is a schematic flowchart of obtaining a target face image according to yet another embodiment.

In one embodiment, as shown in FIG. 9, step 704 of blending, by using the target image blending algorithm, the first adjusted face image and the second face image based on the target face mask to obtain a target face image includes the following steps:

Step 902: Determine a region of interest from the first adjusted face image according to the target face mask, and calculate a first gradient field of the region of interest and a second gradient field of the second face image.

The region of interest refers to a face region in the first adjusted face image.

In some embodiments, the server determines the region of interest from the first adjusted face image according to the face region in the target face mask, and calculates the first gradient field of the region of interest and the second gradient field of the second face image by using a differential operation. Gradients of the region of interest in two directions may be calculated, and the first gradient field may be obtained according to the gradients in the two directions. Gradients of the second face image in two directions may also be calculated, and the second gradient field may be obtained according to the gradients in the two directions.

Step 904: Determine a blended gradient field according to the first gradient field and the second gradient field, and calculate a blended divergence field by using the blended gradient field.

The blended gradient field refers to a gradient field corresponding to the target face image. The blended divergence field refers to a divergence corresponding to the target face image, that is, Laplacian coordinates.

In some embodiments, the server overlays the first gradient field on the second gradient field to obtain the blended gradient field. The server then calculates partial derivatives of gradients in the blended gradient field to obtain the blended divergence field. The server may separately calculate partial derivatives of gradients in two different directions in the blended gradient field, and then add the partial derivatives in the two different directions to obtain the blended divergence field.

Step 906: Determine a second blended pixel value based on the blended gradient field, and obtain the target face image according to the second blended pixel value.

The second blended pixel value refers to pixel values of various pixel points in the target face image.

In some embodiments, the server constructs a coefficient matrix by using the blended divergence field according to a Poisson re-intersection equation, then calculates to obtain the second blended pixel value according to the coefficient matrix, and obtains the target face image according to the second blended pixel value.

In the above embodiment, the first adjusted face image and the second face image are blended by using the target image blending algorithm based on the target face mask to obtain the target face image, so that the obtained target face image can have diversity.

In one embodiment, the target face image is used for training a face detection model, and the face detection model is used for determining authenticity of a face image.

In some embodiments, the server uses the method for obtaining the target face image in the above embodiments to generate a large number of target face images for training to obtain a face detection model, and the face detection model is used for detecting the authenticity of a face image. When it is detected that the authenticity of the face image exceeds a preset threshold, it is obtained that the face image is a real face image, and when it is detected that the authenticity of the detected face image does not exceed the preset threshold, it is obtained that the face image is a non-real face image, that is, a fake face image.

Figure 10:
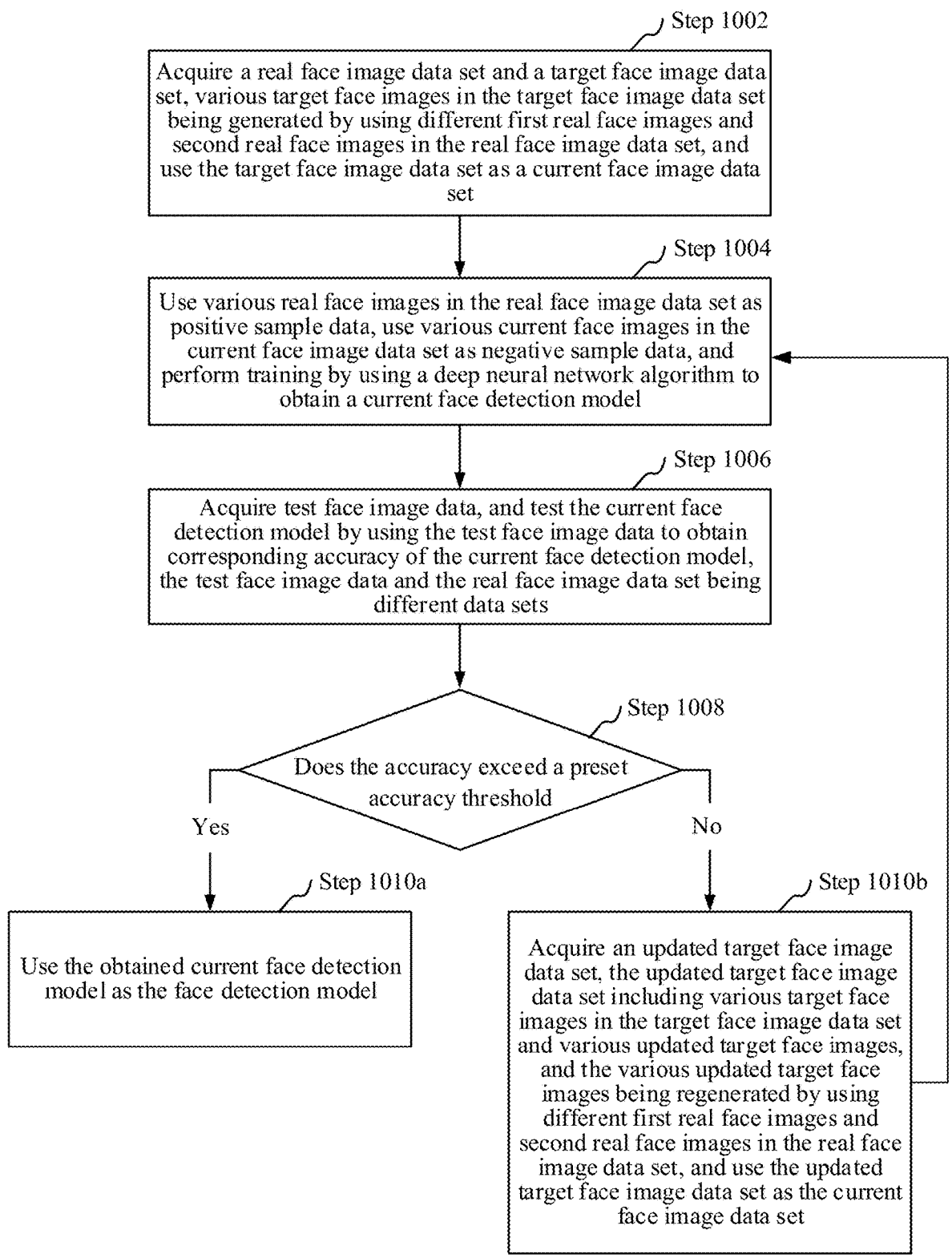
FIG. 10 is a schematic flowchart of obtaining a face detection model consistent with an embodiment of this disclosure.

In one embodiment, as shown in FIG. 10, the training of the face detection model includes the following steps:

Step 1002: Acquire a real face image data set and a target face image data set, various target face images in the target face image data set being generated by using different first real face images and second real face images in the real face image data set, and use the target face image data set as a current face image data set.

The real face image data set refers to an image data set composed of real face images.

In some embodiments, the real face image data set acquired by the server may be acquired from a real face image database of a third-party. It may also be acquired by collecting images of real faces. At the same time, the server generates various target face images by using different first real face images and second real face images in the real face image data set. Random combinations of different image processing algorithms, different color adjustment algorithms, and different image blending algorithms may be used for the first real face image and the second real face image to generate different target face images. Random combinations of different image processing algorithms, different color adjustment algorithms, and different image blending algorithms may be used for different first real face images and second real face images to generate different target face images.

In some embodiments, the real face image data set may be obtained from a real human face video provided in Face-Forensic++(a human face image data set). Then, a target human face image data set is generated by using real human faces in the FaceForensic++.

Step 1004: Use various real face images in the real face image data set as positive sample data, use various current face images in the current face image data set as negative sample data, and perform training by using a deep neural network algorithm to obtain a current face detection model.

In some embodiments, the server uses various real face images in the real face image data set and various current face images in the current face image data set as input to the model for training, and when a training completion condition is met, the current face detection model is obtained. The training completion condition includes that the training reaches a maximum number of iterations, or a value of a loss function meets a preset threshold condition. For example, the server uses an Xception (an extension of an Inception deep convolutional network) network as a network structure of the model, and uses a cross-entropy as the loss function for model training. When the training completion condition is met, the current face detection model is obtained. A network with stronger expressive capability may also be used as the network result of the model for training, for example, a ResNet101 deep residual network, a ResNet152 deep residual network, and the like may be used.

Step 1006: Acquire test face image data, and test the current face detection model by using the test face image data to obtain corresponding accuracy of the current face detection model, the test face image data and the real face image data set being different data sets.

In some embodiments, the server may obtain test face image data from a third-party database, and the test face image data and the real face image data set are different data sets. Then, the test face image data is used for testing the current face detection model, where area under curve (AUC) and average precision (AP) may be used as evaluation indicators to obtain the current face detection model for detecting the accuracy of the authenticity of the face image.

Step 1008: Determine whether the accuracy exceeds a preset accuracy threshold, perform step 1010*a* when the accuracy exceeds the preset accuracy threshold, and perform step 1010*b* when the accuracy does not exceed the preset accuracy threshold.

Step 1010*b*: Acquire an updated target face image data set, the updated target face image data set including various target face images in the target face image data set and various updated target face images, and the various updated target face images being regenerated by using different first real face images and second real face images in the real face image data set; and use the updated target face image data set as the current face image data set, and return to perform step 1004.

Step 1010*a*: Use the obtained current face detection model as the face detection model.

The preset accuracy threshold refers to a preset accuracy threshold of the face detection model for detecting the authenticity of the face image.

In some embodiments, when the accuracy does not exceed the preset accuracy threshold, it indicates that the model obtained by training has poor generalization capability on other data sets. At this time, the server acquires the updated target face image data set, and uses the updated target face image data set to iteratively train the current face detection model again. The updated target face image data set includes the target face images used in the previous training and regenerated target face images. That is, the face detection model is trained by the target face images in enhanced training samples.

In the above embodiment, by obtaining the target face image data set, the target face image data set and the real face image data set are then used for training to obtain the face detection model. The target face image data set has a rich diversity of target face images, thereby improving the generalization capability of the face detection model obtained by training, and then the face detection model is used for detecting the authenticity of the face image, thereby improving the accuracy of detecting the authenticity of the face image.

In some embodiments, the existing human face intelligent model and the face detection model of this application are tested by using the test face image data, and obtained evaluation indicator data is shown in Table 1 below:

TABLE 1

Evaluation Indicator Data Table

| Test data set | Test data set 1 (AUC/AP) | Test data set 2 (AUC/AP) |
| --- | --- | --- |
| Existing human face intelligent model 1 | 0.362/0.501 | 0.490/0.508 |
| Existing human face intelligent model 2 | 0.748/0.690 | 0.712/0.735 |
| Face detection model of this application | 0.762/0.834 | 0.766/0.802 |

The test data set 1 may be a celeb-DF (deep human face extraction data set), and the test data set 2 may be a Deepfake Detection Challenge (DFDC) data set. Evaluation indicators of the face detection model obtained by training after data enhancement in this application have achieved better results than evaluation indicators of existing artificial intelligence models. That is, the face detection model of this application significantly improves the generalization performance of the model, thereby making the detection result more accurate.

In one embodiment, after using the obtained current face detection model as the face detection model, the method further includes:

acquiring a face image to be detected, inputting the face image to be detected into a face detection model for detection to obtain a detection result, and generating alarm information if the detection result is a non-real face image.

The face image to be detected refers to a face image whose authenticity needs to be detected. The detection result refers to a result indicating whether the face image to be detected is a real face image, including a result of being a non-real face image and a result of being a real face image. The alarm information is used for reminding that the face image to be detected is non-real, indicating that the face image to be detected is a non-real face image.

In some embodiments, the server acquires the face image to be detected, and the face image to be detected may be a face image uploaded by a user, a face image recognized by the server from various videos, a face image stored in a database in the server, or the like. The server deploys the trained face detection model in advance, and then inputs the face image to be detected into the face detection model for detection, that is, obtains a detection result outputted by the face detection model. When the detection result is that the face image to be detected is a real face image, no processing is performed. When the detection result is that the face image to be detected is a non-real face image, alarm information is generated, and the alarm information is transmitted to a management terminal for display, so that the management terminal performs subsequent processing.

In the above embodiment, by using the face detection model to detect the face image to be detected, the detection result is obtained, and if the detection result is a non-real face image, alarm information is generated, which improves the accuracy of the face detection model for detecting the non-real face image.

Figure 11:
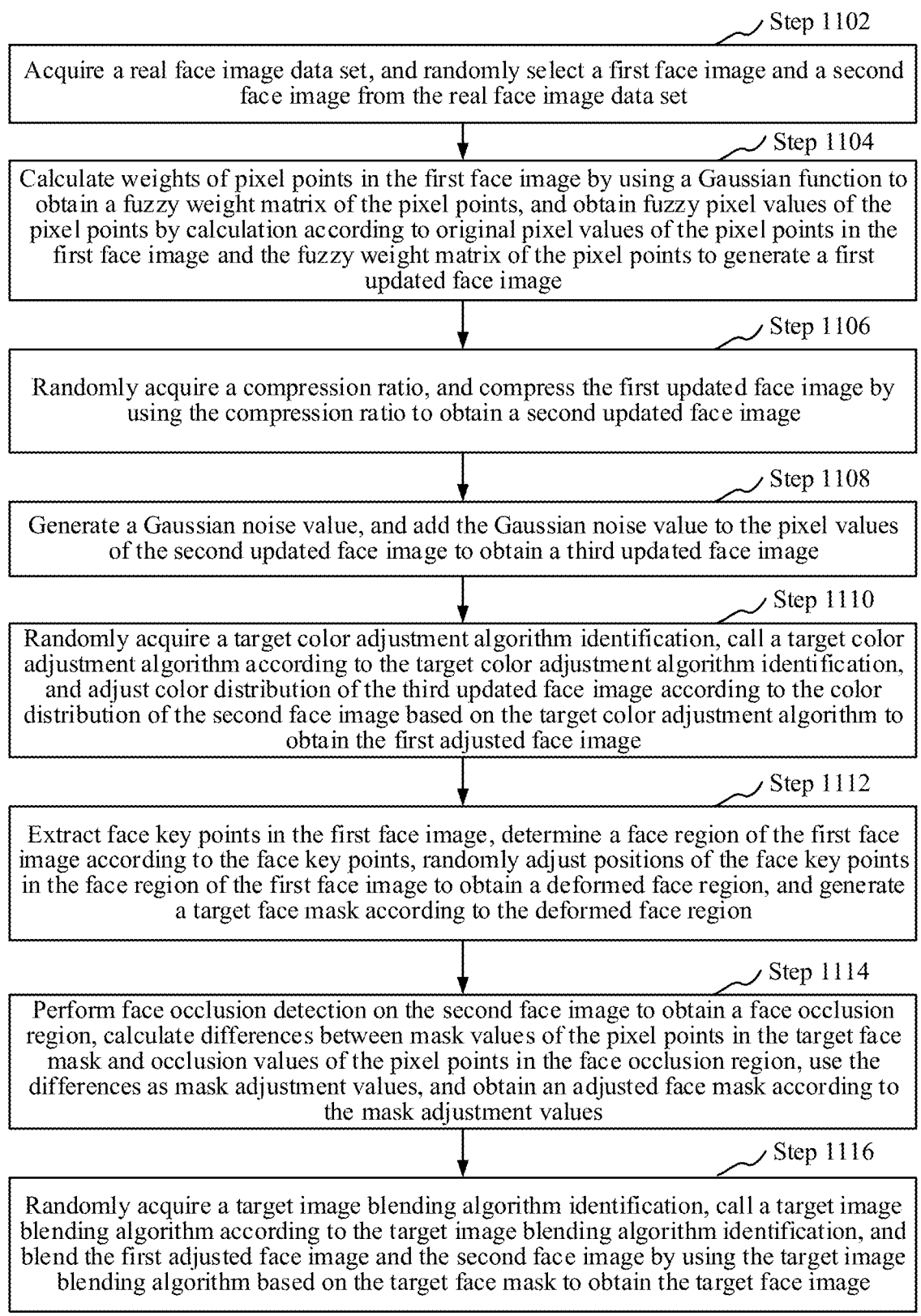
FIG. 11 is a schematic flowchart of obtaining a target face image according to some embodiments.

In some embodiments, as shown in FIG. 11, the face image processing method in some embodiments includes the following steps:

Step 1102: Acquire a real face image data set, and randomly select a first face image and a second face image from the real face image data set.

Step 1104: Calculate weights of pixel points in the first face image by using a Gaussian function to obtain a fuzzy weight matrix of the pixel points; and obtain fuzzy pixel values of the pixel points according to original pixel values of the pixel points in the first face image and the fuzzy weight matrix of the pixel points to generate a first updated face image. That is, Gaussian blur is performed.

Step 1106: Randomly acquire a compression ratio, and compress the first updated face image by using the compression ratio to obtain a second updated face image. That is, image compression is performed.

Step 1108: Generate a Gaussian noise value, and add the Gaussian noise value to the pixel values of the second updated face image to obtain a third updated face image. That is, random noise addition is performed.

Figure 12:
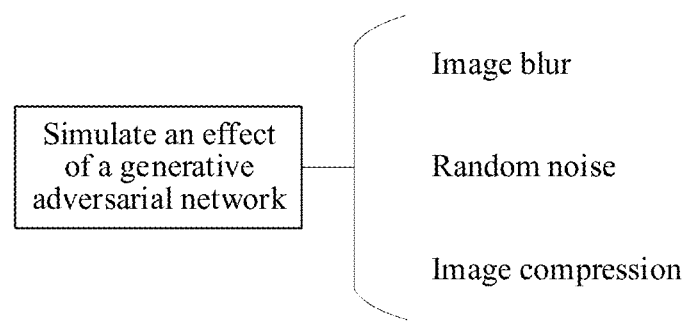
FIG. 12 is a schematic diagram of an image processing method randomly selected according to some embodiments consistent with FIG. 11.

In this embodiment, when generating the target face image, the server may randomly select the steps that need to be performed from steps 1104, 1106, and 1108 to obtain the corresponding updated face image, and perform subsequent processing by using the corresponding updated face image. For example, the server may perform step 1104, perform step 1106, perform step 1108, perform steps 1104 and 1106, perform steps 1106 and 1108, or the like to obtain the corresponding performing result, where the performing of a step is processing the performing result of the previous step. Even if the generated updated face image has the effect of a generative adversarial network, it may have one effect or a plurality of effects, as shown in FIG. 12, which is a schematic diagram of a method of simulating the effect of a generative adversarial network that can be randomly selected.

Figure 13:
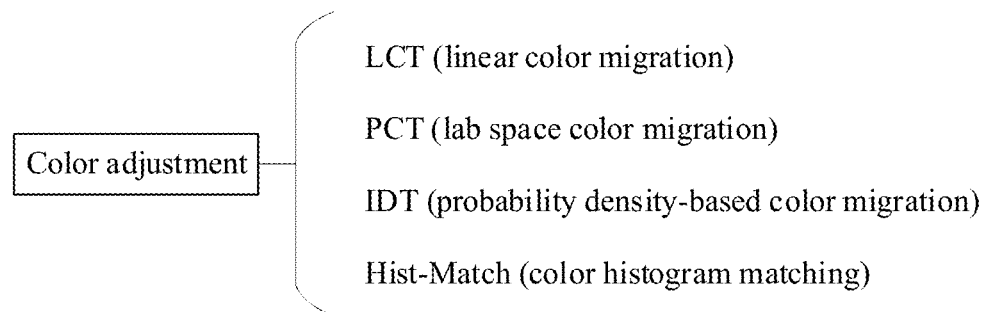
FIG. 13 is a schematic diagram of names of color adjustment algorithms randomly selected according to some embodiments consistent with FIG. 11.

Step 1110: Randomly acquire a target color adjustment algorithm identification, call a target color adjustment algorithm according to the target color adjustment algorithm identification, and adjust color distribution of the third updated face image according to the color distribution of the second face image based on the target color adjustment algorithm to obtain the first adjusted face image. As shown in FIG. 13, a schematic diagram of names of target color adjustment algorithms that can be randomly selected is shown, and a target color adjustment algorithm is randomly selected from the target color adjustment algorithms included in FIG. 13.

Figure 14:
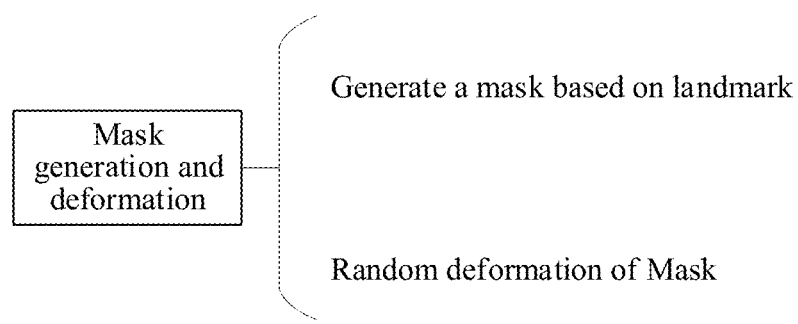
FIG. 14 is a schematic diagram of mask generation and deformation according to some embodiments consistent with FIG. 11.

Step 1112: Extract face keypoints in the first face image, determine a face region of the first face image according to the face keypoints, randomly adjust positions of the face keypoints in the face region of the first face image to obtain a deformed face region, and generate a target face mask according to the deformed face region. As shown in FIG. 14, a schematic diagram of mask generation and random deformation is shown.

Step 1114: Perform face occlusion detection on the second face image to obtain a face occlusion region, calculate differences between mask values of the pixel points in the target face mask and occlusion values of the pixel points in the face occlusion region, use the differences as mask adjustment values, and obtain an adjusted face mask according to the mask adjustment values.

Figure 15:
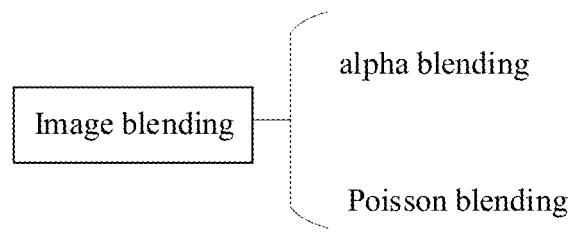
FIG. 15 is a schematic diagram of names of image blending algorithms randomly selected according to some embodiments consistent with FIG. 11.

Step 1116: Randomly acquire a target image blending algorithm identification, call a target image blending algorithm according to the target image blending algorithm identification, and blend the first adjusted face image and the second face image by using the target image blending algorithm based on the target face mask to obtain the target face image. As shown in FIG. 15, a schematic diagram of names of image blending algorithms that can be randomly selected is shown, and the name of a target image blending algorithm is randomly selected from 15 types of image blending algorithms included in the figure.

In this embodiment, the server repeatedly performs the above steps, and each time during performing, the server randomly selects a corresponding method from FIG. 12, FIG. 13, FIG. 14, and FIG. 15 to perform the corresponding steps, thereby ensuring the generation of a diversity of target face images to obtain a target face image data set.

Figure 16:
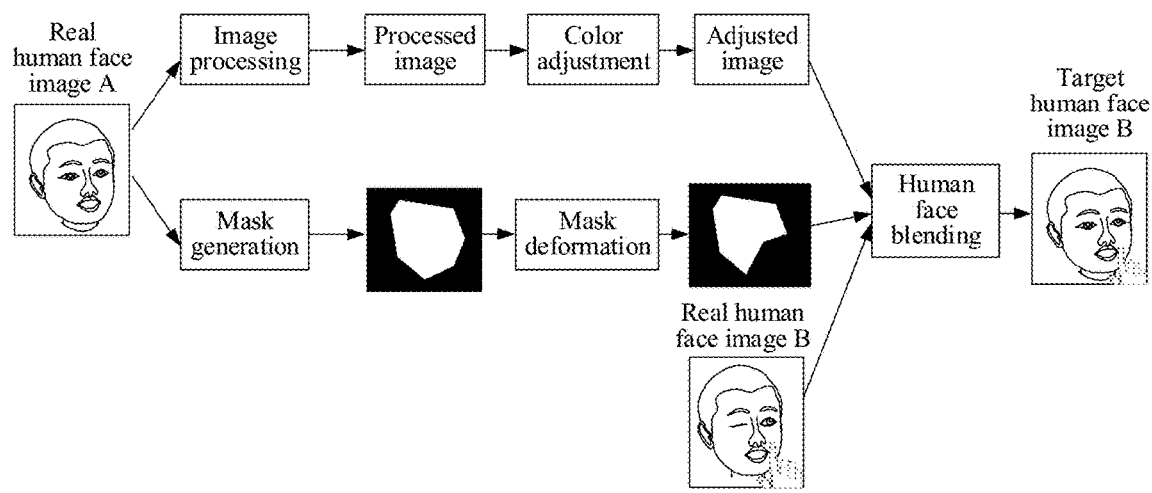
FIG. 16 is a schematic diagram of a framework of a face image processing method according to some embodiments.
Figure 17:
FIG. 17 is a partial schematic diagram of a target face image generated according to some embodiments consistent with FIG. 16.
Figure 18:
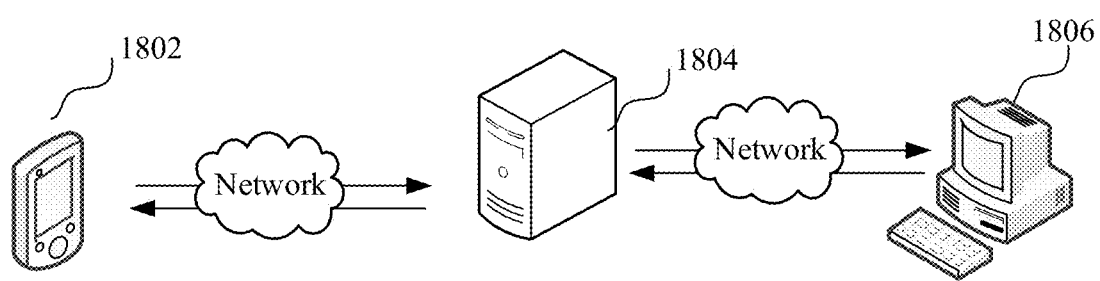
FIG. 18 is a schematic diagram of an application environment of the face image processing method according to some embodiments consistent with FIG. 16.

This application further provides an application scenario where the above face image processing method is applied. In some embodiments, the application of the face image processing method in the application scenario is as follows:

As shown in FIG. 16, a schematic diagram of a human face image processing framework is provided. A server acquires a real human face image A and a real human face image B. The real human face image A is processed to generate a first updated human face image with non-real human face image characteristics. Color distribution of the first updated human face image is adjusted according to color distribution of the real human face image B to obtain a first adjusted human face image. A corresponding face mask is generated according to the real human face image A, and then the face mask is deformed to obtain a target human face mask after deformation. The first adjusted human face image and the real human face image B are blended according to the target human face mask to obtain a target human face image. A large number of target human face images are generated by using the framework shown in FIG. 16, a partial schematic diagram of the generated target human face images is shown in FIG. 17, including synthetic human face images with high realism and synthetic human face images with poor realism, and the synthetic human face images shown in FIG. 17 are all colored images. Then, a human face authenticity detection model is obtained by training the large number of generated target human face images and real human face images. Then, the human face authenticity detection model is deployed in a human face recognition payment platform. As shown in FIG. 18, a schematic diagram of an application environment of the face image processing method is shown. The face image processing method is applied to the human face recognition payment platform including a user terminal 1802, a platform server 1804, and a monitoring terminal 1806. That is, when the user terminal 1802 performs human face recognition payment, a human face image is collected by a camera, and the human face image is transmitted to the platform server 1804 through a network. The platform server 1804 uses the deployed human face authenticity detection model to perform authenticity detection on the collected human face image, so as to obtain a detection result. If the detection result is a non-real human face, alarm information is generated to indicate that the human face recognition is failed, the human face is a non-real human face, and the alarm information is transmitted to the monitoring terminal 1806 for display. At the same time, payment failure information is transmitted to the user terminal 1802 for display. By identifying the authenticity of the human face collected by a monitoring device, the security of human face recognition payment can be improved.

This application further provides an application scenario where the above face image processing method is applied. In some embodiments, the application of the face image processing method in the application scenario is as follows:

A first human face image and a second human face image are acquired, the first human face image and the second human face image being images of real human faces. The first human face image is processed to generate a first updated human face image with non-real human face image characteristics. Color distribution of the first updated human face image is adjusted according to color distribution of the second human face image to obtain a first adjusted human face image. A target human face mask of the first human face image is obtained, the target human face mask being generated by randomly deforming a human face region of the first human face image. The first adjusted human face image and the second human face image are blended according to the target human face mask to obtain a target human face image. A large number of target human face images are generated by the above method, a human face-swapping detection model is obtained by training using the large number of target human face images and a real human face image data set, and the human face-swapping detection model is deployed to an Internet video media platform for use. When acquiring a video uploaded by a user, the Internet video media platform acquires a human face image from the video, inputs the human face image to be detected into the human face-swapping detection model to obtain a face-swapping detection result. The face-swapping detection result includes a human face image after face swapping and a human face image without face swapping. The human face image after face swapping is a non-real human face image, and the human face image without face swapping is a real human face image. When the human face image to be detected is the human face image after face swapping, and it is recognized that the human face image after face swapping violates the portrait right, posting of the video uploaded by the user is forbidden, and a reason for prohibiting the posting of the video is returned to the user.

It is to be understood that, although the steps in the flowcharts of FIG. 2 to FIG. 4 and FIG. 6 to FIG. 11 are sequentially displayed according to indication of arrows, the steps are not necessarily sequentially performed in the sequence indicated by the arrows. Unless clearly specified in this specification, there is no strict sequence limitation on the execution of the steps, and the steps may be performed in another sequence. In addition, at least some steps in FIG. 2 to FIG. 4 and FIG. 6 to FIG. 11 may include a plurality of substeps or a plurality of stages. The sub steps or the stages are not necessarily performed at the same moment, and instead may be performed at different moments. A performing sequence of the substeps or the stages is not necessarily performed in sequence, and instead may be performed in turn or alternately with another step or at least some of substeps or stages of another step.

Figure 19:
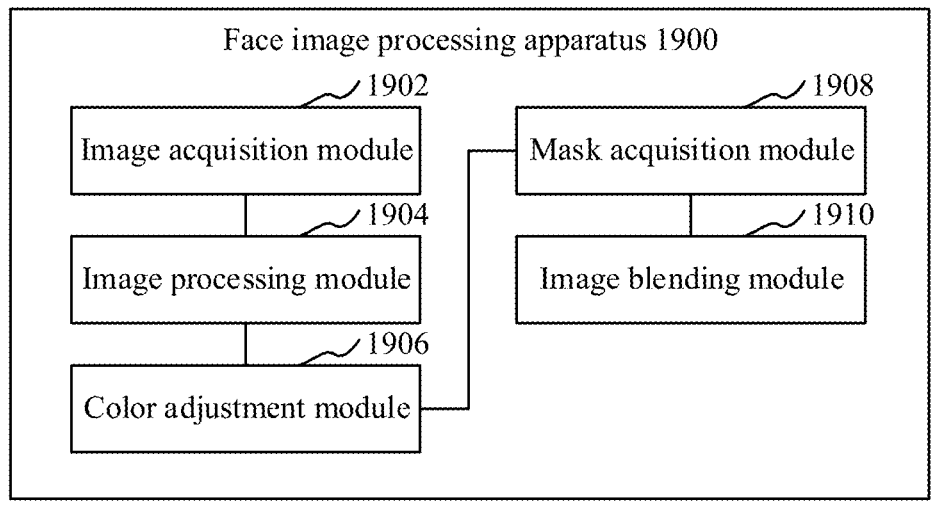
FIG. 19 is a structural block diagram of a face image processing apparatus consistent with an embodiment of this disclosure.

In one embodiment, as shown in FIG. 19, a face image processing apparatus 1900 is provided. The apparatus may adopt a software module, a hardware module, or a combination of the two to become a part of a computer device. The apparatus includes an image acquisition module 1902, an image processing module 1904, a color adjustment module 1906, a mask acquisition module 1908, and an image blending module 1910.

The image acquisition module 1902 is configured to acquire a first face image and a second face image, the first face image and the second face image being images of real faces.

The image processing module 1904 is configured to process the first face image to generate a first updated face image with non-real face image characteristics.

The color adjustment module 1906 is configured to adjust color distribution of the first updated face image according to color distribution of the second face image to obtain a first adjusted face image.

The mask acquisition module 1908 is configured to acquire a target face mask of the first face image, the target face mask being generated by randomly deforming a face region of the first face image.

The image blending module 1910 is configured to blend the first adjusted face image and the second face image according to the target face mask to obtain a target face image.

In one embodiment, the image processing module 1904 includes:
  a Gaussian fuzzy unit configured to calculate weights of pixel points in the first face image by using a Gaussian function to obtain a fuzzy weight matrix of the pixel points; and obtain fuzzy pixel values of the pixel points according to original pixel values of the pixel points in the first face image and the fuzzy weight matrix of the pixel points, and generate a first updated face image with the non-real face image characteristics based on the fuzzy pixel values of the pixel points.

In one embodiment, the image processing module 1904 includes:
  an image compression unit configured to acquire a compression ratio, and compress the first face image by using the compression ratio to obtain a compressed first face image; and use the compressed first face image as the first updated face image with the non-real face image characteristics.

In one embodiment, the image processing module 1904 includes:
  a noise condition unit configured to generate a Gaussian noise value, and add the Gaussian noise value to the pixel values of the first face image to obtain the first updated face image with the non-real face image characteristics.

In one embodiment, the mask acquisition module 1908 includes:
  a keypoint extraction unit configured to extract face keypoints in the first face image, and determine a face region of the first face image according to the face keypoints; and
  a calling unit configured to randomly adjust positions of the face keypoints in the face region of the first face image to obtain a deformed face region, and generate the target face mask according to the deformed face region.

In one embodiment, the face image processing apparatus 1900 further includes:

an occlusion detection module configured to perform face occlusion detection on the second face image to obtain a face occlusion region; and
a mask adjustment module configured to adjust the target face mask according to the face occlusion region to obtain an adjusted face mask.

The image blending module 1910 is further configured to blend the first adjusted face image and the second face image according to the adjusted face mask to obtain the target face image.

In one embodiment, the mask adjustment module is further configured to calculate differences between mask values of pixel points in the target face mask and occlusion values of pixel points in the face occlusion region, and use the differences as mask adjustment values; and obtain the adjusted face mask according to the mask adjustment values.

In one embodiment, the color adjustment module 1906 is further configured to acquire a target color adjustment algorithm identification, and call a target color adjustment algorithm according to the target color adjustment algorithm identification, the target color adjustment algorithm including at least one of a color migration algorithm and a color matching algorithm; and adjust, based on the target color adjustment algorithm, the color distribution of the first updated face image to be consistent with the color distribution of the second face image to obtain the first adjusted face image.

In one embodiment, the image blending module 1910 includes:
a calling unit configured to acquire a target image blending algorithm identification, and call a target image blending algorithm according to the target image blending algorithm identification; the target image blending algorithm including at least one of an alpha blending algorithm, a Poisson blending algorithm, and a neural network algorithm; and
a blending unit configured to blend, by using the target image blending algorithm, the first adjusted face image and the second face image based on the target face mask to obtain a target face image.

In one embodiment, the blending unit is further configured to determine a first adjusted face region from the first adjusted face image according to the target face mask; and blend the first adjusted face region to a position of the face region in the second face image to obtain the target face image.

In one embodiment, the blending unit is further configured to determine a region of interest from the first adjusted face image according to the face mask, and calculate a first gradient field of the region of interest and a second gradient field of the second face image; determine a blended gradient field according to the first gradient field and the second gradient field, and calculate a blended divergence field by using the blended gradient field; and determine a second blended pixel value based on the blended gradient field, and obtain the target face image according to the second blended pixel value.

In one embodiment, the face image processing apparatus 1900 further includes:
a data acquisition module configured to acquire a real face image data set and a target face image data set, various target face images in the target face image data set being generated by using different first real face images and second real face images in the real face image data set, and use the target face image data set as a current face image data set;

a model training module configured to use various real face images in the real face image data set as positive sample data, use various current face images in the current face image data set as negative sample data, and perform training by using a deep neural network algorithm to obtain a current face detection model;
a model test module configured to acquire test face image data, and test the current face detection model by using the test face image data to obtain corresponding accuracy of the current face detection model, the test face image data and the real face image data set being different data sets;
an updated data acquisition module configured to acquire an updated target face image data set when the accuracy is less than a preset accuracy threshold, the updated target face image data set including various target face images in the target face image data set and various updated target face images, and the various updated target face images being regenerated by using different first real face images and second real face images in the real face image data set; and
an iterative loop module configured to use the updated target face image data set as the current face image data set, return to perform the step of using various real face images in the real face image data set as positive sample data, using various current face images in the current face image data set as negative sample data, and performing training by using a deep neural network algorithm to obtain a current face detection model until the accuracy exceeds the preset accuracy threshold, and use the obtained current face detection model as the face detection model.

In one embodiment, the face image processing apparatus 1900 further includes:
an image detection module configured to acquire a face image to be detected, input the face image to be detected into a face detection model for detection to obtain a detection result, and generate alarm information if the detection result is a non-real face image.

For the specific limitation to the face image processing apparatus, reference can be made to the above limitation to the face image processing method, which will not be repeated here. Various modules in the above face image processing apparatus may be implemented in whole or in part by software, hardware, and a combination thereof. The foregoing modules may be built in or independent of a processor of a computer device in a hardware form, or may be stored in a memory of the computer device in a software form, so that the processor invokes and performs an operation corresponding to each of the foregoing modules.

In one embodiment, a computer device is provided. The computer device may be a server, and an internal structure diagram thereof may be shown in FIG. 20. The computer device includes a processor, a memory, and a network interface that are connected through a system bus. The processor of the computer device is configured to provide computing and control capabilities. The memory of the computer device includes a non-volatile storage medium and an internal memory. The non-volatile storage medium stores an operating system, computer-readable instructions, and a database. The internal memory provides an environment for running of the operating system and the computer-readable instructions in the non-volatile storage medium. The database of the computer device is configured to store target face image data. The network interface of the computer device is configured to communicate with an external terminal through a network connection. The computer readable instructions, when executed by the processor, implement a face image processing method.

Figure 20:
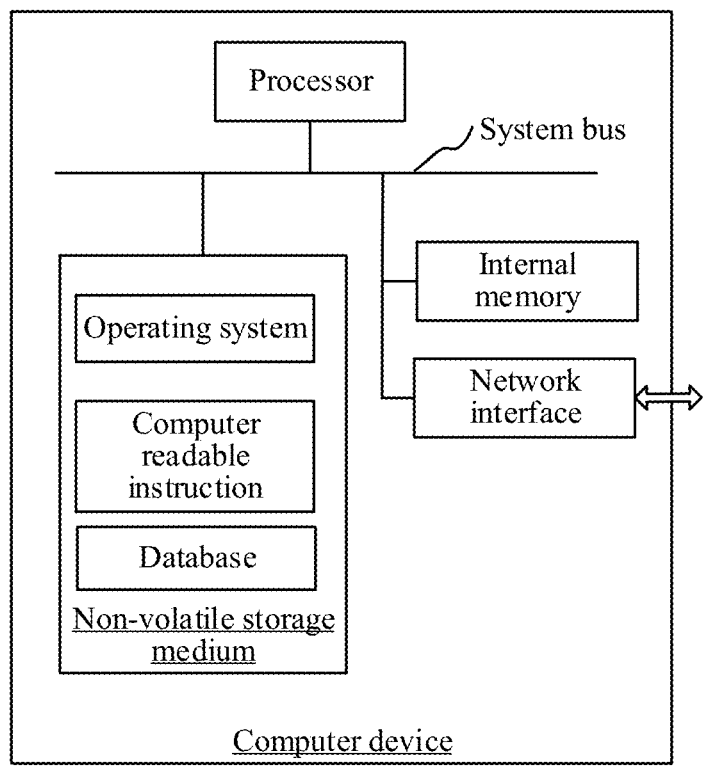
FIG. 20 is a diagram of an internal structure of a computer device consistent with an embodiment of this disclosure.

A person skilled in the art may understand that the structure shown in FIG. 20 is merely a block diagram of a partial structure related to a solution in this application, and does not constitute a limitation to the computer device to which the solution in this application is applied. In some embodiments, the computer device may include more or fewer components than those shown in the figure, or have some components combined, or have a different component deployment. In one embodiment, a computer device is provided, including a memory and a processor, the memory storing computer-readable instructions, the processor, when executing the computer-readable instructions, implementing the steps in the foregoing method embodiments.

In one embodiment, a computer device is further provided, including a memory and a processor, the memory storing computer-readable instructions, the computer-readable instructions, when executed by the processor, causing the processor to implement the steps in the foregoing method embodiments.

In one embodiment, one or more non-volatile storage media storing computer-readable instructions are provided, the computer-readable instructions, when executed by one or more processors, causing the one or more processors to implement the steps in the foregoing method embodiments.

In one embodiment, a computer program product or a computer program is provided, the computer program product or the computer program including computer instructions, and the computer instructions being stored in a computer-readable storage medium. The processor of the computer device reads the computer instructions from the computer-readable storage medium, and the processor executes the computer instructions, to cause the computer device to perform the steps in the method embodiments.

A person of ordinary skill in the art may understand that some or all procedures in the foregoing method embodiments may be implemented by a computer program instructing related hardware. The computer program may be stored in a non-volatile computer-readable storage medium, and when the computer program is executed, the procedures of the foregoing method embodiments may be performed. Any reference to a memory, a storage, a database, or another medium used in the embodiments provided in this application may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

The technical features in the foregoing embodiments may be combined in different manners to form other embodiments. For concise description, not all possible combinations of the technical features in the embodiments are described. However, provided that combinations of the technical features do not conflict with each other, the combinations of the technical features are considered as falling within the scope described in this specification.

The foregoing embodiments only describe several implementations of this application, which are described in detail, but cannot be construed as a limitation to the patent scope of this application. For a person of ordinary skill in the art, several transformations and improvements can be made without departing from the idea of this application. These transformations and improvements belong to the protection scope of this application. Therefore, the protection scope of this application is subject to the protection scope of the appended claims.

What is claimed is:

1. A face image processing method, performed by a computer device, comprising:
   acquiring a first face image and a second face image, the first face image and the second face image being images of real faces;
   generating a first updated face image with non-real face image characteristics based on the first face image;
   adjusting color distribution of the first updated face image according to color distribution of the second face image to obtain a first adjusted face image;
   acquiring a target face mask of the first face image, the target face mask being generated by randomly deforming a face region of the first face image;
   performing face occlusion detection on the second face image to obtain a face occlusion region;
   adjusting the target face mask according to the face occlusion region to obtain an adjusted face mask;
   blending the first adjusted face image and the second face image according to the adjusted face mask to obtain a target face image; and
   training a face detection model using the target face image, the face detection model being used for determining authenticity of a face image, the determining the authenticity of the face image comprising detecting whether the face image is a non-real face image forged through a technical means.

2. The method according to claim 1, wherein the generating the first updated face image with the non-real face image characteristics based on the first face image comprises:
   calculating weights of pixel points in the first face image by using a Gaussian function to obtain a fuzzy weight matrix of the pixel points; and
   obtaining fuzzy pixel values of the pixel points according to original pixel values of the pixel points in the first face image and the fuzzy weight matrix of the pixel points, and generating the first updated face image with the non-real face image characteristics based on the fuzzy pixel values of the pixel points.

3. The method according to claim 1, wherein generating the first updated face image with the non-real face image characteristics based on the first face image comprises:
   acquiring a compression ratio, and compressing the first face image by using the compression ratio to obtain a compressed first face image; and
   using the compressed first face image as the first updated face image with the non-real face image characteristics.

4. The method according to claim 1, wherein the generating the first updated face image with the non-real face image characteristics based on the first face image comprises:
   generating a Gaussian noise value, and adding the Gaussian noise value to the pixel values of the first face image to obtain the first updated face image with the non-real face image characteristics.

5. The method according to claim 1, wherein the acquiring the target face mask of the first face image, the target face mask being generated by randomly deforming a face region of the first face image comprises:
   extracting face keypoints in the first face image, and determining a face region of the first face image according to the face keypoints; and randomly adjusting positions of the face keypoints in the face region of the first face image to obtain a deformed face region, and generating the target face mask according to the deformed face region.

6. The method according to claim 1, wherein the adjusting the target face mask according to the face occlusion region to obtain the adjusted face mask comprises:
calculating differences between mask values of pixel points in the target face mask and occlusion values of pixel points in the face occlusion region, and using the differences as mask adjustment values; and
obtaining the adjusted face mask according to the mask adjustment values.

7. The method according to claim 1, wherein the adjusting the color distribution of the first updated face image according to the color distribution of the second face image to obtain the first adjusted face image comprises:
acquiring a target color adjustment algorithm identification, and calling a target color adjustment algorithm according to the target color adjustment algorithm identification, the target color adjustment algorithm comprising at least one of a color migration algorithm and a color matching algorithm; and
adjusting, based on the target color adjustment algorithm, the color distribution of the first updated face image to be consistent with the color distribution of the second face image to obtain the first adjusted face image.

8. The method according to claim 1, wherein the blending the first adjusted face image and the second face image according to the target face mask to obtain the target face image comprises:
acquiring a target image blending algorithm identification, and calling a target image blending algorithm according to the target image blending algorithm identification; the target image blending algorithm comprising at least one of an alpha blending algorithm, a Poisson blending algorithm, and a neural network algorithm; and
blending, by using the target image blending algorithm, the first adjusted face image and the second face image based on the target face mask to obtain a target face image.

9. The method according to claim 8, wherein the blending, by using the target image blending algorithm, the first adjusted face image and the second face image based on the target face mask to obtain the target face image comprises:
determining a first adjusted face region from the first adjusted face image according to the target face mask; and
blending the first adjusted face region to a position of the face region in the second face image to obtain the target face image.

10. The method according to claim 8, wherein the blending, by using the target image blending algorithm, the first adjusted face image and the second face image based on the target face mask to obtain the target face image comprises:
determining a region of interest from the first adjusted face image according to the target face mask, and calculating a first gradient field of the region of interest and a second gradient field of the second face image;
determining a blended gradient field according to the first gradient field and the second gradient field, and calculating a blended divergence field by using the blended gradient field; and
determining a second blended pixel value based on the blended gradient field, and obtaining the target face image according to the second blended pixel value.

11. The method according to claim 1, wherein the training of the face detection model comprises the following operations:
acquiring a real face image data set and a target face image data set, various target face images in the target face image data set being generated by using different first real face images and second real face images in the real face image data set;
using the target face image data set as a current face image data set, using various real face images in the real face image data set as positive sample data, using various current face images in the current face image data set as negative sample data, and performing training by using a deep neural network algorithm to obtain a current face detection model;
acquiring test face image data, and testing the current face detection model by using the test face image data to obtain corresponding accuracy of the current face detection model, the test face image data and the real face image data set being different data sets;
acquiring an updated target face image data set when the accuracy is less than a preset accuracy threshold, the updated target face image data set comprising various target face images in the target face image data set and various updated target face images, and the various updated target face images being regenerated by using different first real face images and second real face images in the real face image data set; and using the updated target face image data set as the current face image data set, returning to perform the operation of using various real face images in the real face image data set as positive sample data, using various current face images in the current face image data set as negative sample data, and performing training by using a deep neural network algorithm to obtain a current face detection model until the accuracy exceeds the preset accuracy threshold, and using the obtained current face detection model as the face detection model.

12. The method according to claim 11, wherein after the using the obtained current face detection model as the face detection model, the method further comprises:
acquiring a face image to be detected, inputting the face image to be detected into a face detection model for detection to obtain a detection result, and generating alarm information if the detection result is a non-real face image.

13. A computer device, comprising a memory and a processor, the memory storing a computer program, and the processor, when executing the computer program, being configured to perform:
acquiring a first face image and a second face image, the first face image and the second face image being images of real faces;
the generating a first updated face image with non-real face image characteristics based on the first face image;
adjusting color distribution of the first updated face image according to color distribution of the second face image to obtain a first adjusted face image;
acquiring a target face mask of the first face image, the target face mask being generated by randomly deforming a face region of the first face image;
performing face occlusion detection on the second face image to obtain a face occlusion region;
adjusting the target face mask according to the face occlusion region to obtain an adjusted face mask;

blending the first adjusted face image and the second face image according to the adjusted face mask to obtain a target face image; and training a face detection model using the target face image, the face detection model being used for determining authenticity of a face image, the determining the authenticity of the face image comprising detecting whether the face image is a non-real face image forged through a technical means.

14. The computer device according to claim 13, wherein the generating the first updated face image with the non-real face image characteristics based on the first face image comprises:

calculating weights of pixel points in the first face image by using a Gaussian function to obtain a fuzzy weight matrix of the pixel points; and obtaining fuzzy pixel values of the pixel points according to original pixel values of the pixel points in the first face image and the fuzzy weight matrix of the pixel points, and generating the first updated face image with the non-real face image characteristics based on the fuzzy pixel values of the pixel points.

15. The computer device according to claim 13, wherein the generating the first updated face image with the non-real face image characteristics based on the first face image comprises:

acquiring a compression ratio, and compressing the first face image by using the compression ratio to obtain a compressed first face image; and using the compressed first face image as the first updated face image with the non-real face image characteristics.

16. A non-transitory computer-readable storage medium, storing a computer program, and the computer program, when executed by a processor, causing the processor to perform operations comprising:

acquiring a first face image and a second face image, the first face image and the second face image being images of real faces;

generating a first updated face image with non-real face image characteristics based on the first face image;

adjusting color distribution of the first updated face image according to color distribution of the second face image to obtain a first adjusted face image;

acquiring a target face mask of the first face image, the target face mask being generated by randomly deforming a face region of the first face image;

performing face occlusion detection on the second face image to obtain a face occlusion region;

adjusting the target face mask according to the face occlusion region to obtain an adjusted face mask;

blending the first adjusted face image and the second face image according to the adjusted face mask to obtain a target face image; and training a face detection model using the target face image, the face detection model being used for determining authenticity of a face image, the determining the authenticity of the face image comprising detecting whether the face image is a non-real face image forged through a technical means.

17. The computer-readable storage medium according to claim 16, wherein the generating the first updated face image with the non-real face image characteristics based on the first face image comprises:

generating a Gaussian noise value, and adding the Gaussian noise value to the pixel values of the first face image to obtain the first updated face image with the non-real face image characteristics.

18. The computer-readable storage medium according to claim 16, wherein the acquiring the target face mask of the first face image, the target face mask being generated by randomly deforming a face region of the first face image comprises:

extracting face keypoints in the first face image, and determining a face region of the first face image according to the face keypoints; and randomly adjusting positions of the face keypoints in the face region of the first face image to obtain a deformed face region, and generating the target face mask according to the deformed face region.

* * * * *